UNITED STATES PATENT OFFICE.

CHARLES STUART BAILEY, OF ST. AUGUSTINE, FLORIDA.

COMPOSITION FOR REMOVING PAINT.

SPECIFICATION forming part of Letters Patent No. 555,065, dated February 25, 1896.

Application filed September 30, 1895. Serial No. 564,165. (No specimens.)

*To all whom it may concern:*

Be it known that I, CHARLES STUART BAILEY, of St. Augustine, in the county of St. Johns and State of Florida, have invented certain new and useful Improvements in Compositions of Matter for Removing Paint; and I do hereby declare the following to be a full, clear, and exact description of the invention, such as will enable others skilled in the art to which it appertains to make and use the same.

My invention relates to an improvement in composition of matter for removing paint, and the object is to provide a chemical composition which will without the aid of heat act rapidly and at the same time effectively in loosening paint, irrespective of its hardness or the number of coats, without injury to the wood or other articles on which the paint is located.

By my invention I supersede the common method of removing paint by burning, and it has the advantage of leaving the wood in a better condition for repainting.

With this end in view my invention consists in a mixture of the following ingredients, namely: calcium sulphuret, calcium oxide, barium oxide, arsenious acid, and soda-ash, united in suitable proportions with sufficient water to make a stiff paste. These ingredients are boiled together and ground down to a fine state of subdivision.

While different proportions might be used, I have found that the following give excellent results, namely: calcium sulphuret, ten parts; calcium oxide, forty parts; barium oxide, sixteen parts; arsenious acid, ten parts; soda-ash, twenty-four parts. These are mixed with water, and I add starch, gum catechu or other vegetable matter to act mechanically in preventing sediment.

In order to give the composition a particularly severe test, I have applied it to railroad-cars, because they are always exceptionally well and carefully painted, as well as varnished, and I have found that it requires only an hour to soften the four coats of paint and three coats of varnish to which cars are usually subjected. After covering the surface to be cleaned with my composition and allowing it to stand for about an hour I find that both the composition and paint will come off together by scraping with a painter's knife and washing with water, and when the cleaned surface is dry by brushing off with a dry brush the wood, iron, or other material so treated will be found in perfect condition for repainting.

The action of my composition is perfectly under the control of the skilled operator by adjusting its strength by the addition of water and regulating the time which it is allowed to remain in contact with the paint. By this means either the varnish alone or the varnish and any desired number of coats of paint can be removed.

It is evident that slight changes might be resorted to in the proportions used, and hence I do not wish to limit myself to the exact composition herein set forth.

Having fully described my composition of matter for removing paint, what I claim as new, and desire to secure by Letters Patent, is—

1. A composition of matter for removing paint consisting of calcium sulphuret, calcium oxide, barium oxide, arsenious acid and soda-ash, mixed with water.

2. A composition of matter for removing paint consisting of calcium sulphuret, calcium oxide, barium oxide, arsenious acid and soda-ash, mixed with vegetable matter to act mechanically to prevent sediment, substantially as set forth.

In testimony whereof I have signed this specification in the presence of two subscribing witnesses.

CHARLES STUART BAILEY.

Witnesses:
   JAMES A. DALY,
   R. DALE SPARHAWK.